April 18, 1961 — F. F. TIMPNER ET AL — 2,980,441
FLUID SUSPENSION UNIT
Filed Nov. 28, 1958 — 2 Sheets-Sheet 1

INVENTORS
Fred F. Timpner
John Z. DeLorean
Carl J. Miller
BY
THEIR ATTORNEY

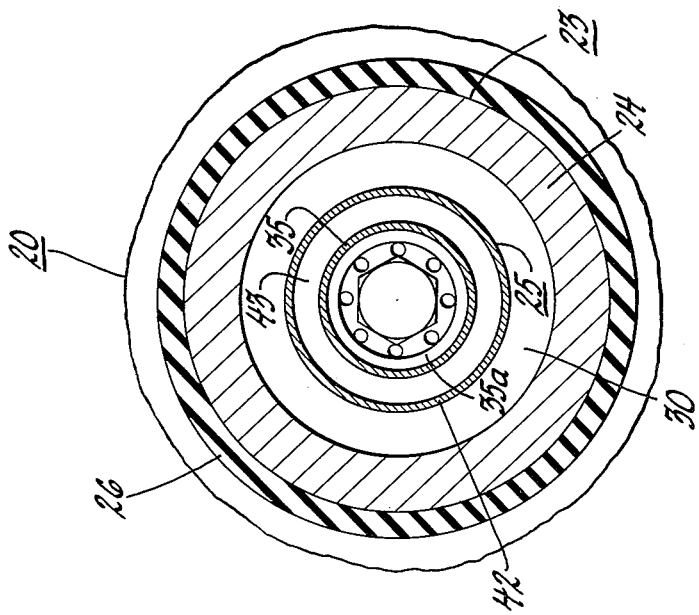
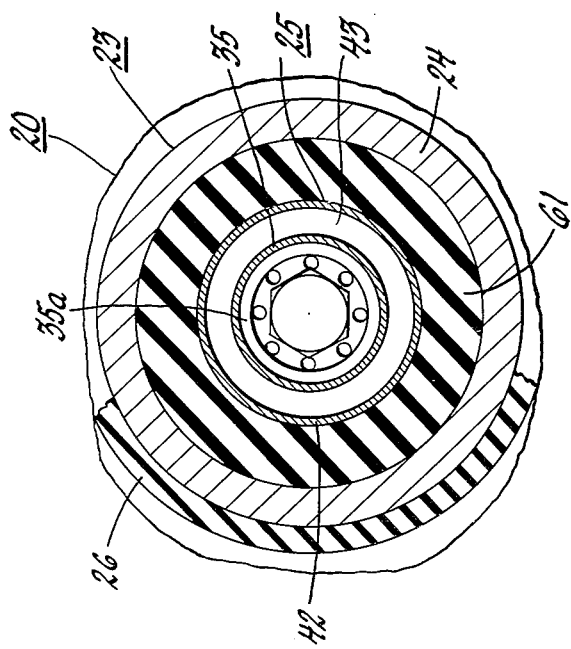

United States Patent Office 2,980,441
Patented Apr. 18, 1961

2,980,441
FLUID SUSPENSION UNIT

Fred F. Timpner and John Z. De Lorean, Birmingham, and Carl J. Miller, Warren, Mich., assignors to General Motors Corporation, Detroit, Mich., a corporation of Delaware Filed Nov. 28, 1958, Ser. No. 776,781

11 Claims. (Cl. 280—124)

This invention relates to a suspension system for a motor vehicle, and more particularly to a suspension system that uses a fluid spring, or an air spring, between the sprung mass and the unsprung mass of the vehicle to support the sprung mass upon the unsprung mass.

In suspension systems for motor vehicles that utilize an air spring for supporting the chassis relative to the running gear, it has been the practice to place the air spring between the chassis and the running gear so that the air spring performs the function of spring support of the sprung mass on the unsprung mass of the vehicle. The shock absorption system has been retained separate from the air spring with the shock absorber unit, in effect, being placed in parallel arrangement with the air spring, opposite ends of the shock absorber being connected to the sprung mass and the unsprung mass to provide for the desired absorption of road shock created by the running gear in operating under normal road conditions. Thus, the fluid spring, or the air spring, performs its normal function of providing for resilience of suspension between the sprung mass and the unsprung mass and the shock absorber independently performs its function of absorbing the road shocks and controlling the rebound of the sprung mass relative to the unsprung mass.

It is desirable from a standpoint of design and production economy, as well as space economy, to combine the fluid spring with the shock absorber. With the air spring and the shock absorber construction and arranged as a unit assembly for placement between the sprung mass and the unsprung mass of the vehicle, production economies can be obtained by simplification of the design of the chassis frame and of the undercarriage for the wheel structure by the elimination of dual mounting requirements of the previously arranged separate units of air spring and shock absorber.

However, there are certain difficulties in combining the shock absorber with the air springs to obtain a unit arrangement in that there are transverse or lateral thrusts developed within the air spring in its normal operation on a motor vehicle which are transferable to the shock absorber when the shock absorber is incorporated within the air spring and a part of the shock absorber is used as one of the mounting elements for supporting a part of the air spring either on the unsprung mass of the wheel structure or on the sprung mass of the chassis.

It is therefore an object of this invention to provide an air spring incorporating a shock absorber within the air spring in such a manner that transverse or lateral thrusts developed within the air spring are not transferable directly to the shock absorber, but rather are accepted by a resilient structure positioned between the shock absorber and the air spring so that the resilient structure absorbs the transverse or lateral thrusts created by the air spring on the shock absorber. The arrangement is such, therefore, that the conventional piston and cylinder type of shock absorber, that is a direct-acting type, is capable of being used as at least one of the mounting members for supporting the air spring between the sprung mass and the unsprung mass of the vehicle, the elimination or reduction of lateral or transverse thrusts on the shock absorber avoiding high friction in the movement of the piston within the cylinder of the shock absorber.

It is another object of the invention to provide an air spring incorporating a shock absorber as an integral part thereof wherein the shock absorber is placed within the interior of the air spring, that is within the air chamber of the air spring, with the shock absorber having one end thereof attached to a stationary wall of the air spring and the opposite end of the shock absorber extending through a movable wall of the air spring with the said opposite end of the shock absorber providing the mounting means for supporting the air spring on the vehicle structure. In this arrangement of the combined air spring and shock absorber, the shock absorber extends through a movable wall of the air spring with the movable wall being supported by the shock absorber, a resilient pad of material being positioned between the movable wall and the shock absorber to allow for resilience of movement of the movable wall of the air spring relative to the shock absorber to reduce or prevent transfer of transverse or lateral thrusts from the movable wall of the air spring to the shock absorber.

It is another object of the invention to provide a combined air spring and shock absorber constructed and arranged in accordance with that defined in the foregoing object wherein the pad of resilient material between the movable wall of the air spring and the shock absorber consists of a rubber-like or elastomeric material which also provides a seal between the movable wall and the shock absorber to prevent escape of fluid pressure from within the air spring.

Further objects and advantages of the present invention will be apparent from the following description, reference being had to the accompanying drawings wherein preferred embodiments of the present invention are clearly shown.

In the drawings:

Fig. 2 is a transverse cross-sectional view of the shock absorber and air spring taken along line 2—2 of Fig. 1.

Fig. 3 is a transverse cross-sectional view of the combined air spring and shock absorber taken along line 3—3 of Fig. 1.

Figure 1:
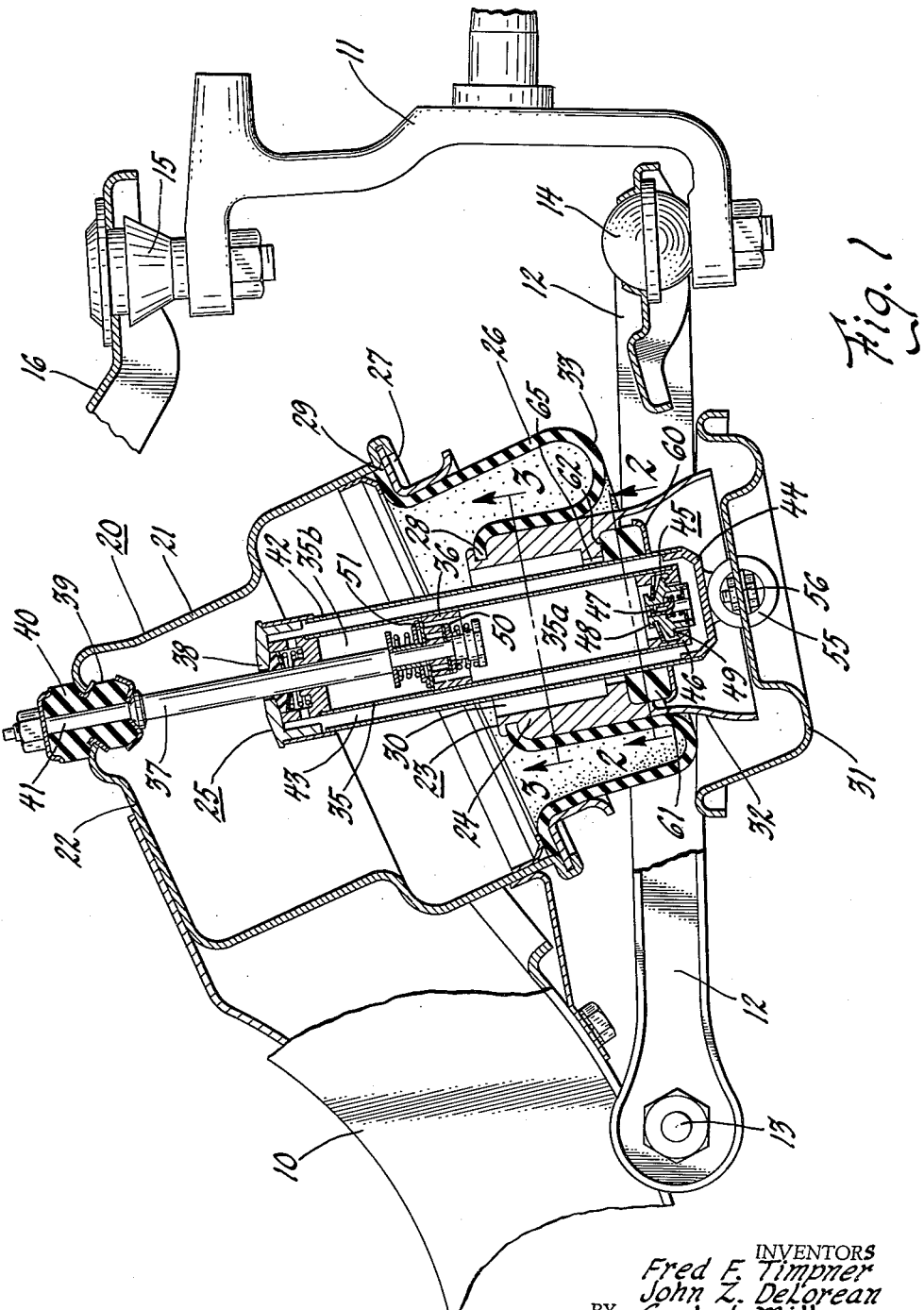
Fig. 1 is a side view, partially in elevation and partially in cross section, of a suspension structure incorporating the combined air spring and shock absorber of this invention.

In Fig. 1 there is illustrated a part of a motor vehicle that includes a chassis frame 10 disposed at the forward end of the vehicle. A steering knuckle 11 is supported upon the chassis member 10 by means of a lower control arm 12 that has one end thereof in pivotal connection with the chassis frame 10 by means of the pivot connection 13. The opposite end of the lower control arm connects with the steering knuckle through a spherical or ball joint 14. The steering knuckle 11 is connected by means of a spherical joint 15 with the upper control arm 16 that, in turn, is pivotally connected with the chassis frame 10 with a pivot connection much like the member 13.

An air spring 20 that includes a shock absorber 25 is positioned between the chassis frame 10 and the lower control arm 12 thereby providing for a resilient shock absorbing support of the unsprung mass of the vehicle comprising the wheel support structure 12, 11 and 16 relative to the sprung mass or the chassis frame 10 that supports the body of the vehicle.

The air spring 20 comprises a container 21 that is in the form of an open-ended container or can 21 having an upper stationary wall 22 and a lower movable wall 23, more specifically described hereinafter. The container 21 is suitably secured to the chassis frame 10 and thereby forms a stationary part of the air spring that is stationary with the chassis frame 10.

The lower movable wall 23 comprises a piston element 24 and a flexible diaphragm element 26 that connects the piston element 24 with the open end 27 of the stationary can or container 21. The diaphragm 26 is preformed in the general form of a torous having an inner peripheral edge 28 that is suitably secured to the upper end of the piston member 23 and an outer peripheral edge 29 that is suitably secured to the open end 27 of the container 21. The flexible diaphragm 26 therefore allows movement of the piston member 23 into and out of the chamber formed by the container 21 on relative movement between the control arms 12 and 16 relative to the chassis frame 10.

The piston member 23 has an axial opening 30 through which the shock absorber 25 extends for attachment to a support member 31 secured to the lower control arm 12, in a manner hereinafter described. The outer periphery 32 of the piston 23 is contoured to be engaged by the peripheral surface 33 of the diaphragm 26 on movement of the piston into and out of the container 21, the contour of the piston 23 being such as to provide for increased resistance to compression of the air spring as the control arm 12 moves upwardly toward the chassis frame 10.

The container 21 receives air under pressure from a suitable source of supply, such as a reservoir, not shown, carried on the vehicle, the reservoir being supplied with air under pressure and maintained at a predetermined pressure value within the reservoir by means of a compressor, not shown, driven by the engine of the vehicle. The air under pressure from the reservoir is supplied to a suitable control valve that responds to a change in clearance height between the sprung mass and the unsprung mass of the vehicle, that is between the body and the running gear, to either add air under pressure into the container 21 when the load in the vehicle increases or to exhaust air from within the container 21 when the load within the vehicle decreases. Such control valves for accomplishing this purpose are now known in the art and it is believed no further description of such valves need be made since the valve per se and the specific control of the air to and from the air spring forms no part of this particular invention.

The shock absorber 25 is of a more or less conventional type of direct-acting shock absorber that includes a cylinder 35 receiving a piston 36 reciprocable within the cylinder. The piston 36 is connected with an operating rod 37 that extends through the closed end 38 of the shock absorber cylinder and is provided with an attachment fitting 39 secured to the stationary wall 22 of the container 21, a suitable rubber-like member 40, or elastomeric member, being positioned between the upper end 41 of the rod 37 and the container 21 whereby the rod 37 is resiliently movable relative to the can 21 but firmly fixed thereto.

The shock absorber cylinder 35 is contained within an outer cylinder 42 that cooperates with the cylinder 35 to form a reservoir chamber 43, the closure wall 44 closing the lower end of the reservoir chamber whereas the wall 38 closes the upper end of the reservoir chamber.

The cylinder 35 has a base valve 45 positioned in the closure wall 46 at the lower end of the cylinder 35, the base valve 45 including a resistance valve member 47 that controls flow of hydraulic fluid from within the chamber 35a into the reservoir 43 on movement of the piston 36 toward the base valve 45. The base valve member 48 is raised from its seat 49 on movement of the piston 36 away from the base valve to allow relatively free flow of hydraulic fluid from the chamber 43 into the chamber 35a during the period of movement of the piston away from the base valve.

The piston 36 is provided with resistance valving 51 on the upper face thereof and other resistance valving 50 on the lower face of the piston to control the flow of hydraulic fluid between the chamber 35a and the chamber 35b of the shock absorber during reciprocation of the piston within the cylinder 35.

The direct-acting shock absorber thus described is of a more or less conventional type and any one of a number of such shock absorbers will satisfactorily perform the desired shock absorber function when incorporated within the air spring 20 as illustrated in Fig. 1.

The outer cylinder 42 of the shock absorber 25 carries a mounting ring 55 that is suitably supported upon a mounting stud 56 carried on the support 31. The shock absorber thus has its opposite ends connected with the stationary wall 22 of the air spring 20 and the lower control arm 12 of the wheel support system so that road shocks occurring to the wheel system will be absorbed by the shock absorber in transfer to the chassis frame 10. Thus, the shock absorber performs its usual function of absorbing the road shock during the compression stroke of the shock absorber and controlling the rebound of the chassis frame in the opposite direction.

The outer cylinder 42 of the shock absorber 25 carries an annular seat member 60 secured rigidly thereto such as by a welding operation. The seat member 60 supports an annular pad 61 of resilient material, such as a rubber-like or elastomeric material. The inner surface of the annular ring 61 engages the outer periphery of the cylinder 42 and forms an air seal therewith.

As shown in Fig. 1, the piston 23 is provided with an annular seat 62 that seats upon the upper surface of the resilient annulus 61 whereby the piston 23 is supported by the cylinder 42 of the shock absorber through the medium of the resilient annulus. It will also be noted that the structure just described provides for the movable wall of the air spring to be supported by the shock absorber upon the lower control arm 12 through the medium of the cylinder 42 of the shock absorber and the support ring 55 rigidly secured to the closure wall 44 of the shock absorber. Thus, the shock absorber 25 not only connects the lower control arm 12 with the chassis frame 10 for its normal purpose of absorption of shock and control of rebound, but it also provides the support of the movable wall of the air spring in its normal function of resiliently supporting the chassis frame 10 relative to the lower control arm 12. A clearance opening 65 is provided in the piston 23 forming the movable wall of the air spring to allow for transverse movement of the piston element relative to the shock absorber 25.

It will be appreciated that in the normal operation of the wheel support system, the control arm 12, as well as the control arm 16, move in an arcuate course relative to the chassis frame 10. This arcuate course of movement transmitted to the movable wall 23 of the air spring would normally create transverse or lateral forces on the shock absorber 25 if the movable wall of the air spring were fastened rigidly to the shock absorber. Such action would result in a high degree of friction in movement of the shock absorber piston 36 within its cylinder 35 and would produce undue strain and stress upon the shock absorber rod 37, thereby shortening the life of the shock absorber and the rod seal for the same.

However, placement of the resilient rubber-like elastomeric annulus 61 between the piston 24 and the shock absorber allows relative movement between the movable wall of the air spring and the shock absorber so that angular deflection between the movable wall of the air spring and the shock absorber will be transmitted to the resilient elastomeric annulus 61 and thereby reduce or eliminate the transverse or lateral forces that might otherwise be transmitted to the shock absorber 25.

It will also be appreciated that with the movable wall piston element seating upon the resilient annulus 61, an air seal is provided to prevent loss of air under pressure from within the container 21, the compression of the elastomeric member 61 by the weight of the vehicle creating a good air seal between the elastomeric member 61 and the seat 62, as well as with the outer periphery of the shock absorber cylinder 42.

While the embodiments of the present invention as herein disclosed constitute a preferred form, it is to be understood that other forms might be adopted.

What is claimed is as follows:

1. In an air suspension unit for supporting the sprung mass of a vehicle on the unsprung mass, the combination of, an air spring comprising a hollow container having a stationary wall and a movable wall connected by a flexible wall providing for relative movement between the stationary and movable walls, and a shock absorber unit positioned largely within said container connected between said stationary wall and said movable wall with a resilient pad on the shock absorber supporting the movable wall on the shock absorber unit with a nonrigid connection therebetween insulating transmission of angular displacement movement between the movable wall and the shock absorber.

2. An air suspension unit constructed and arranged in accordance with claim 1 wherein said resilient pad includes wall surfaces engaging said movable wall and said shock absorber unit forming fluid seals thereby between the movable wall and the shock absorber unit to prevent escape of air from said container.

3. In an air suspension unit for supporting the sprung mass of a vehicle on the unsprung mass, the combination of, an air spring comprising a hollow open-ended container, a wall at the open end of said container movable relative to the same and connected to the container by a flexible wall providing for the said relative movement, and a shock absorber unit positioned within said container having one end thereof connected with said container and the opposite end connected with said wall with a resilient pad on the shock absorber supporting the said wall on the shock absorber unit with a nonrigid connection therebetween insulating transmission of angular displacement movement between the wall and the shock absorber.

4. In an air suspension unit for supporting the sprung mass of a vehicle on the unsprung mass, the combination of, an air spring comprising a hollow open-ended container, a wall at the open end of said container movable relative to the same and connected to the container by a flexible diaphragm wall providing for the said relative movement, a shock absorber comprising a cylinder and piston arrangement in which the piston reciprocates in said cylinder and rod means is attached to said piston with the rod means extending from the cylinder, said shock absorber member being positioned within said container with the cylinder or the rod part attached to said container and with the other of the respective parts extending through said wall, the other of said parts of said shock absorber supporting a resilient member on the exterior thereof, said resilient member supporting said movable wall on the exterior of said shock absorber with a nonrigid connection insulating angular displacement of the movable wall from the shock absorber.

5. In an air suspension unit for supporting the sprung mass of a vehicle on the unsprung mass, the combination of, an air spring comprising a hollow container having a stationary wall and a movable wall connected by a flexible wall providing for relative movement between the stationary and movable walls, a shock absorber member comprising a cylinder and piston arrangement in which the piston reciprocates in said cylinder and a rod means is attached to said piston with the rod means extending from one end of the cylinder, said shock absorber member being positioned within said container with the said cylinder or the said rod means attached to said stationary wall and with the other of the parts of the shock absorber means extending through said movable wall for attachment to a part of the vehicle, and a resilient pad of elastomeric material carried on the exterior of the part of the shock absorber that extends through said movable wall, said movable wall being supported exteriorly of the shock absorber on said pad providing thereby for relative angular displacement movement between the movable wall and the shock absorber member during movement of the movable wall relative to the stationary wall.

6. In an air suspension unit for supporting the sprung mass of a vehicle on the unsprung mass, the combination of, an air spring comprising a hollow container having a stationary wall and a movable wall connected by a flexible wall providing for relative movement between the stationary and movable walls, a direct-acting type shock absorber member comprising a cylinder and piston arrangement in which the piston reciprocates in said cylinder and rod means is attached to said piston with the rod means extending from one end of the cylinder, said shock absorber member being positioned within said container with the said cylinder or the said rod means attached to said stationary wall with the other of the said parts of the shock absorber extending through said movable wall, an annular member of elastomeric material supported upon the exterior of said shock absorber part that extends through the said movable wall, the said movable wall being supported exteriorly of the shock absorber on the said annular member providing thereby for resilience of angular movement between the said movable wall and the said shock absorber member and provide an air seal against loss of air from said container.

7. In an air suspension unit for supporting the sprung mass of a vehicle on the unsprung mass, the combination of, an air spring comprising a hollow open-ended container, a piston member at the open end of said container movable generally axially of the container and connected with the said open end thereof by a flexible diaphragm means adapted to conform to the exterior periphery of the piston member on movement thereof relative to the container, a shock absorber unit comprising a cylinder and shock absorber piston arrangement in which the shock absorber piston reciprocates in said cylinder and rod means is attached to said shock absorber piston with the rod means extending from one end of the cylinder, said shock absorber being positioned generally within said container with the said cylinder or the said rod means connected with said container at the closed end thereof and with the other of the parts of the said shock absorber extending through said first-mentioned piston member for attachment to a part of a vehicle, and a resilient elastomeric annular member carried on the part of the shock absorber that extends through said first-mentioned piston member supporting said first-mentioned piston member thereon exteriorly thereof and providing for resilience of angular movement between the said first-mentioned piston member and the said shock absorber.

8. An air suspension unit constructed and arranged in accordance with claim 7 wherein the said first-mentioned piston member has a wall surface forming a seat engaged by a wall surface of the said elastomeric member forming thereby an air seal to prevent loss of air from the said container.

9. In a suspension system for a motor vehicle, the combination, a chassis member, a movable member associated with a wheel system of the vehicle, said last-mentioned member being movable relative to said chassis member, an air spring comprising a hollow container having a stationary wall and a movable wall with the movable wall connected with the stationary wall by a flexible wall providing for relative movement between the stationary and movable walls, said container having one of the said stationary or movable walls secured to one of the said members with the other of said stationary or movable walls positioned in close proximity to the other of the said members, a shock absorber unit comprising a cylinder and piston arrangement in which the piston reicprocates in the cylinder part and rod means attached to the piston with the rod means extending from one end of the cylinder, said shock absorber member being disposed within said container with the said cylinder part or the said rod means thereof connected with one of the said stationary or movable walls and the other of the said parts extending through the other of said stationary or movable walls and connected with the said member that is in close proximity with the said other wall, and an annulus member of resilient material carried on the exterior of the said shock absorber part extending through the said movable wall supporting the said movable wall on the exterior of the said shock absorber part for resilience of angular movement between the said movable wall and said shock absorber.

10. A suspension system for a motor vehicle constructed and arranged in accordance with claim 9 wherein the said movable wall of said container comprises a piston movable into and out of the container, and wherein the flexible wall comprises a flexible diaphragm member that conforms to the exterior periphery of the just mentioned piston member on its movement into and out of the said chamber, the just mentioned piston seating upon the said resilient member to support the same on the said shock absorber part that extends through the said movable wall solely by means of the said resilient member.

11. A suspension system for a motor vehicle constructed and arranged in accordance with claim 10 wherein the said resilient member comprises an annulus of elastomeric material which also forms an air seal preventing escape of air under pressure from the said container.

References Cited in the file of this patent

UNITED STATES PATENTS

| | | |
|---|---|---|
| 1,729,565 | Caretta | Sept. 24, 1929 |
| 2,134,072 | Christensen | Oct. 25, 1938 |
| 2,393,493 | Brown | Jan. 22, 1946 |
| 2,536,626 | Coleman | Jan. 2, 1951 |
| 2,779,603 | McRae | Jan. 29, 1957 |
| 2,793,048 | Adloff | May 21, 1957 |
| 2,893,104 | Hancock | July 7, 1959 |
| 2,916,296 | Muller | Dec. 8, 1959 |
| 2,922,635 | De Lorean | Jan. 26, 1960 |

FOREIGN PATENTS

| | | |
|---|---|---|
| 1,003,608 | Germany | Feb. 28, 1957 |